W. CHIPPERFIELD.
KINEMATOGRAPH CAMERA AND PROJECTING APPARATUS.
APPLICATION FILED APR. 22, 1913.
1,079,108.
Patented Nov. 18, 1913.
2 SHEETS—SHEET 1.
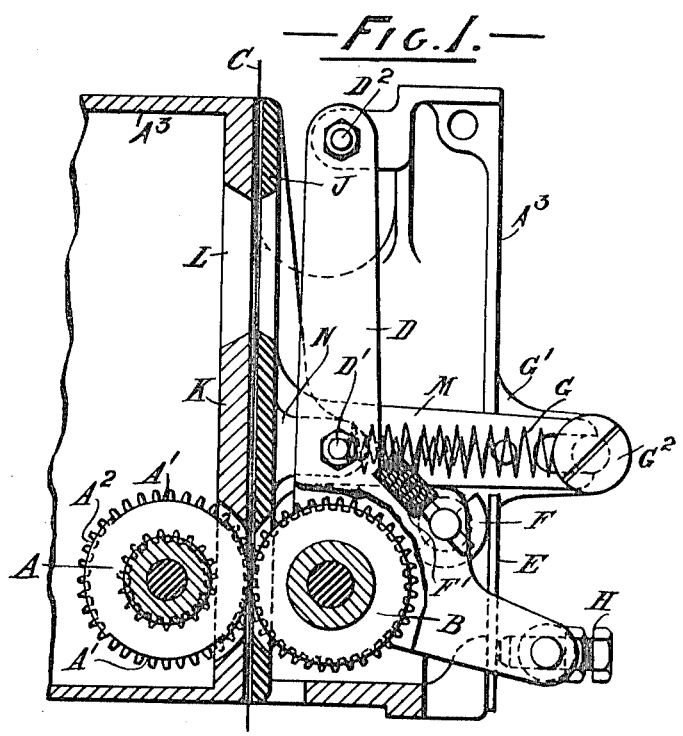

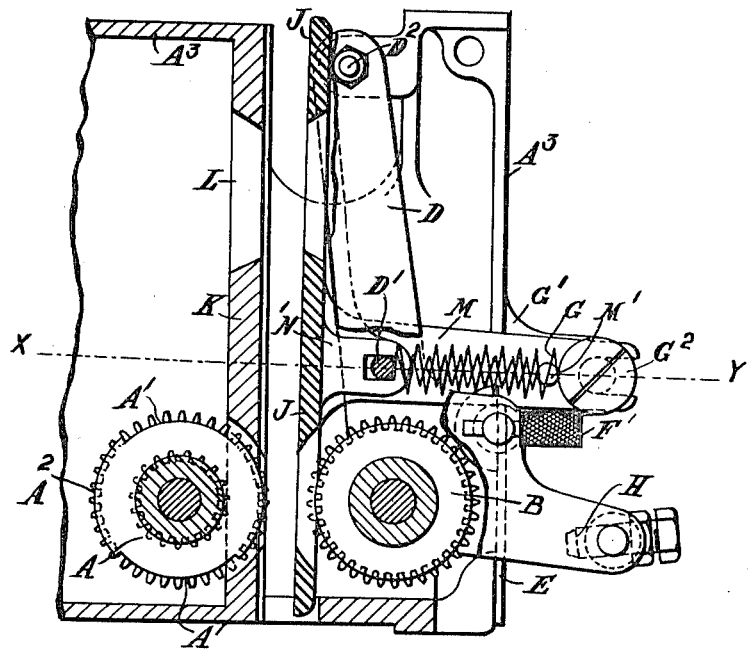
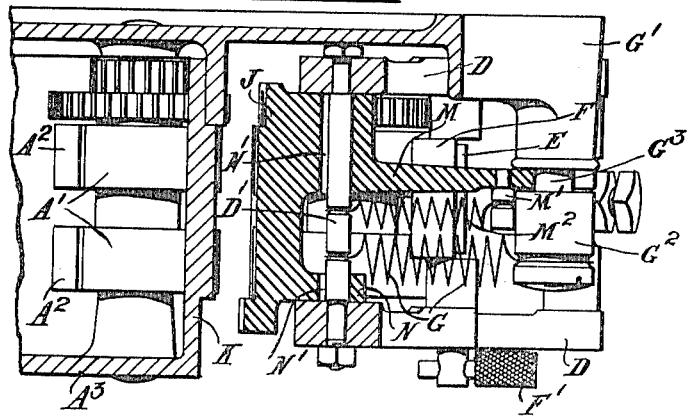

UNITED STATES PATENT OFFICE.

WALTER CHIPPERFIELD, OF ROMFORD, ENGLAND, ASSIGNOR TO WILLIAM EDWARD GARFORTH, OF PONTEFRACT, ENGLAND.

KINEMATOGRAPH CAMERA AND PROJECTING APPARATUS.

1,079,108. Specification of Letters Patent. Patented Nov. 18, 1913.

Application filed April 22, 1913. Serial No. 762,869.

*To all whom it may concern:*

Be it known that I, WALTER CHIPPERFIELD, engineer, a subject of the King of Great Britain, residing at "Kinkora," Woodlands avenue, Great Nelmes, Hornchurch, Romford, Essex, England, have invented certain new and useful Improvements in Kinematograph Cameras and Projecting Apparatus, and of which the following is a specification.

This invention relates to kinematograph cameras and projecting apparatus and has for its object to provide an improved construction to enable the ready insertion of the film through the mechanism which feeds the film step by step as each picture is taken or projected, and also to insure that the film shall not move while the said picture is being taken or projected while allowing of freedom of movement of said film in order to take or project a further picture.

In order that the invention may be clearly understood, reference is made to the accompanying drawings, in which, Figure 1 shows in sectional side elevation the improved gate in the position it assumes when a film is being fed. Fig. 2 is a similar view showing the gate moved to allow of the ready insertion and removal of the film, and Fig. 3 is a section on the line X—Y of Fig. 2.

A is the feed roller and B the pressure roller, which rollers are employed to feed the film, the roller A being formed with two cut-away portions $A^1$, $A^1$, leaving two relatively raised portions $A^2$ for contacting with the film C.

The roller A is mounted in fixed bearings in the frame $A^3$ of the operating mechanism, and is in a known manner driven direct by spur gearing, which gearing also operates a revolving shutter, the raised portions $A^2$ of the roller A during the rotation of the latter, projecting at intervals through an aperture in the front wall K of the frame $A^3$ in which wall an exposure aperture L is formed. The pressure roller B with which coacts the roller A to feed the film has a complete cylindrical surface, and is mounted at the lower ends of pending arms D pivoted at $D^2$ to the frame. These arms are pressed forward so as to press the roller B toward the roller A, and the pressure imparted to the roller B is of an elastic nature, because it is received from a blade spring E attached to the rear of the frame, said spring being pressed against by a cam F carried on a spindle extending between the arm D at the rear thereof and operated by a hand lever $F^1$.

When the hand lever is turned to the right, so as to permit the flat surface of the cam F to face the spring E, as shown in Fig. 2, the pending arms D which constitute a swing frame are permitted to move, and separate the rollers A and B, said frame being caused to swing by the pull of a spring G, which is connected at one end to a rod $D^1$ fixed to and carried between the pending arms D, and is at its other end connected to a pin $G^2$ fixed to a bracket $G^1$ on the frame. Owing to this spring G therefore, when the hand lever $F^1$ is turned to the right, the flat portion of the cam F is brought outward until it rests against the inner face of the spring E, and the said spring G thus holds the swing frame outward and separates the rollers A and B.

The roller B is adapted to contact with the raised axially extending portions $A^2$ of the roller A when the hand lever $F^1$ has been turned to the left, and the amount of further possible movement of the swing frame is limited by means of an adjustable stop H carried at the rear thereof and adapted to bear against an abutment at the rear of the frame $A^3$. Thus, when the film is being fed, between the portion $A^2$ of the roller A and the surface of the roller B, the roller B is held up to the film elastically by the pressure of the spring E, but when the recessed portion $A^1$ of the roller A reaches the film, the roller B cannot press the film C against the recessed portion $A^1$, because its forward motion is limited by the stop H, contacting with an abutment at the rear of the frame.

J is the gate between which gate and the front wall K of the frame $A^3$ the film passes to the rollers A, B, and this gate J is capable of receiving a short forward and backward movement relatively to the frame D, because it is carried by arms M, N having elongated slots N¹ which are traversed by the rod D¹. This rod D¹ acts as partly a guide and support for the said gate J, said slots permitting the arms M and N to move forward and backward a slight distance. The rear end of the arm M is bifurcated as shown, and is guided in its forward and rearward movements by engaging a reduced portion G³ of the pin G².

M¹ is a pin on the arm M, which is connected by a light spring M² to the rod D¹.

When the swing frame D is in its foremost position, as it is when the depressed portion A¹ of the roller A is opposite to the roller B and the adjustable stop H is preventing the said swing frame from moving farther forward, the slots N¹ permit the gate J to advance under the action of the light spring M² into contact with the film C and prevent it from slipping accidentally, and when the raised portions A² of the roller A come in contact with the film, the roller B is pressed outward a slight distance, and the rod D¹ contacting with the rear end of the slots N¹ in the arms N and M, removes the pressure of the gate J from the film and allows the film to be freely driven a further step ready for the next exposure to be taken, or projection to take place.

It will be readily seen that when the lever F¹ is moved to the right, not only do the rollers A and B separate, but the gate J is also moved from the front wall K of the frame of the mechanism, thus leaving as shown in Fig. 2 a considerable gap between the said gate J and the said wall, and it is when these parts are separated in this manner, that the film may be readily inserted in the camera from the side of the same, without the necessity of threading it through the said gap from one end to the other.

By carrying the gate on an arm such as M guided upon the rod D¹ of swing frame and at its rear end by a stationary part of the framework, an approximately parallel movement of the gate to and from the film is obtained, thus separating the gate from the film at substantially equal distances both at the top and bottom of said gate.

What I claim as my invention and desire to secure by Letters Patent is:—

1. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted on said mechanism frame, a pressure roller carried in bearings in said swing frame and adapted to coact with said feed roller to feed the film; of a gate slidably and elastically connected to said swing frame and adjacent to said front wall, and means to elastically press said swing frame toward said front wall between which latter and said gate the film passes.

2. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted at its upper end to the mechanism frame, a pressure roller carried in bearings at the lower end of said swing frame and adapted to coact with said feed roller to feed the film; of a gate adjacent to said front wall elastically connected to said swing frame and capable of sliding thereon between forwardly and rearwardly which gate and front wall the film passes, means to elastically press said swing frame toward said front wall, and an adjustable stop at the rear of said swing frame adapted to contact with a stationary abutment to limit the said movement of said swing frame.

3. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted at its upper end to the mechanism frame, a pressure roller carried in bearings in said swing frame adapted to coact with said roller to feed the film, a rod extending between the side members of said frame, a tension spring connected at one end to said rod, a pin at the rear of said mechanism frame to which pin the other end of said spring is connected said spring tending to swing the lower end of said frame away from said front wall; of means to elastically press said swing frame toward said front wall against the action of said tension spring to allow said pressure roller carried by said swing frame to coact with said feed roller to feed the film, and a gate adjacent to said front wall elastically connected to said swing frame and adapted to move on said frame in a substantially parallel direction toward and away from said front wall between which said front wall and gate the film passes.

4. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted on said mechanism frame, a pressure roller carried in bearings in said swing frame and adapted to coact with said feed roller to feed the film; of a gate arranged adjacent to said front wall and slidably and elastically connected to said swing frame between which gate and said front wall the film passes, a cam rotatably carried at the rear of said swing frame, means to rotate said cam, resilient means at the rear of said frame adapted in a certain position of the cam to act upon said cam to press said swing frame toward said front wall to cause said pressure roller to coact with said feed roller to feed the film, and a tension spring reacting between said swing frame and said mechanism frame adapted to draw said swing frame in a direction away from said front wall.

5. In apparatus employing films for taking kinematograph pictures and for projecting the same; the combination with a feed roller adapted to be driven and carried in stationary bearings in the frame of the operating mechanism and having a raised surface to project through an aperture in the front wall of said frame, a swing frame pivotally mounted on said mechanism frame, a pressure roller carried in bearings in said swing frame and adapted to coact with said feed roller to feed the film; of a gate arranged adjacent to said front wall between which gate and front wall the film passes, a rearwardly extending arm on said gate having an elongated slot therein, a second rearwardly extending arm on said gate having an elongated slot therein in alinement with said slot in said first mentioned arm said second arm being bifurcated at its outer end, a rod fixed at opposite ends to the side members of said frame and passing through said slots in said arms, a pin at the rear of said mechanism frame upon which the bifurcated end of said second arm is adapted to slide, a spring connecting said pin and said rod adapted to pull said swing frame away from said wall and to cause said rod to contact with the rear ends of said slots to move said gate with said swing frame, means for elastically pressing said swing frame toward said front wall, and a pin on said second arm and a tension spring connected at opposite ends to said pin and said rod, said spring being adapted to cause said gate to move relatively to said swing frame in a direction toward said front wall.

6. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted on said mechanism frame, a pressure roller carried in bearings in said swing frame and adapted to coact with said feed roller to feed the film; of a gate slidably and elastically connected to said swing frame adjacent to said front wall between which latter and said gate the film passes, a blade spring fixed to the rear of said mechanism frame, a semicylindrical cam rotatably carried at the rear of said swing frame the curved portion of which cam is adapted to bear against said blade spring to force said swing frame toward said front wall and enable said pressure roller to coact with said feed roller to feed the film, means to rotate said cam, a spring connecting said swing frame to a stationary part of the mechanism frame and adapted to pull said swing frame away from said front wall when said cam is rotated so that its straight surface bears against said blade spring, and a stop carried by said swing frame adapted to contact with said mechanism frame and prevent the movement of the swing frame toward the said front wall beyond a predetermined extent.

7. In apparatus employing films for taking kinematograph pictures and for projecting the same; the combination with a feed roller adapted to be driven and carried in stationary bearings in the frame of the operating mechanism and having a raised surface adapted to project through an aperture in the front wall of said frame, a swing frame pivotally mounted on said mechanism frame, a pressure roller carried in bearings in said swing frame and adapted to coact with said feed roller to feed the film, a gate arranged adjacent to said front wall between which gate and front wall the film passes, a rearwardly extending arm on said gate having an elongated slot therein, a second rearwardly extending arm on said gate having an elongated slot therein in alinement with said slot in said first mentioned arm said second arm being bifurcated at its outer end, a rod fixed at opposite ends to the side members of said frame and passing through said slots in said arms, a pin at the rear of said mechanism frame upon which the bifurcated end of said second arm is adapted to slide, a spring connecting said pin and said rod adapted to pull said swing frame away from said wall and to cause said rod to contact with the rear ends of said slots to move said gate with said swing frame, a pin on said second arm and a tension spring connected at opposite ends to said pin and said rod, said spring being adapted to cause said gate to move relatively to said swing frame in a direction toward said front wall; of a blade spring fixed to the rear of said mechanism frame, a semicylindrical cam rotatably carried at the rear of said swing frame the curved portion of which cam is adapted to bear against said blade spring to force said swing frame toward said front wall and enable said pressure roller to coact with said feed roller to feed the film, means to rotate said cam, and a stop carried by said swing frame adapted to contact with said mechanism frame and prevent the movement of the swing frame toward the said front wall beyond a predetermined extent when the curved part of the cam contacts with said blade spring.

In witness whereof I have hereunto set my hand in the presence of two witnesses.

WALTER CHIPPERFIELD.

Witnesses:
 WILLIAM A. MARSHALL,
 HERBERT D. JAMESON.